United States Patent [19]

Bartl et al.

[11] 4,347,341

[45] Aug. 31, 1982

[54] PROCESS FOR THE PRODUCTION OF ETHYLENE GRAFT COPOLYMERS CONTAINING ANHYDRIDE OR CARBOXYL GROUPS

[75] Inventors: Herbert Bartl, Odenthal; Klaus Schuster, Leverkusen, both of Fed. Rep. of Germany

[73] Assignee: Bayer Aktiengesellschaft, Leverkusen, Fed. Rep. of Germany

[21] Appl. No.: 295,642

[22] Filed: Aug. 24, 1981

[30] Foreign Application Priority Data

Sep. 2, 1980 [DE] Fed. Rep. of Germany ....... 3033001

[51] Int. Cl.$^3$ .................... C08F 263/04; C08F 255/02
[52] U.S. Cl. ..................................... 525/267; 525/244; 525/285; 525/329; 525/378; 525/374; 525/379; 525/384; 525/329.5
[58] Field of Search ........................ 525/244, 285, 267

[56] References Cited

U.S. PATENT DOCUMENTS 3,949,019 4/1976 Zeitler et al. ..................... 525/285
4,157,362 6/1979 Morishita et al. .................. 525/262

Primary Examiner—Carman J. Seccuro
Attorney, Agent, or Firm—Connolly and Hutz

[57] ABSTRACT

A process for the production of ethylene graft copolymers containing anhydride or carboxyl groups in homogeneous or heterogeneous phase in tert.-butanol or methylene chloride wherein (A) from 5 to 70% by weight of a monomer mixture of: (a) from 10 to 80% by weight of a vinyl ester of an aliphatic $C_1$–$C_{18}$-monocarboxylic acid; and (b) from 90 to 30% by weight of maleic acid anhydride and/or its $C_1$–$C_{20}$-alkyl semiesters; are radically polymerized in the presence of (B) from 95 to 30% by weight of an ethylene homopolymer or an ethylene/vinyl ester copolymer as the graft substrate.

7 Claims, No Drawings

PROCESS FOR THE PRODUCTION OF ETHYLENE GRAFT COPOLYMERS CONTAINING ANHYDRIDE OR CARBOXYL GROUPS

This invention relates to a process for the preparation of graft copolymers comprising vinyl esters and maleic acid anhydride and/or its semiesters as the graft monomer and homopolymers or copolymers of ethylene as the graft substrate in homogeneous or heterogeneous phase in tert.-butanol or methylene chloride.

Ethylene polymers, such as polyethylene or ethylene/vinyl ester or ethylene/acrylic ester polymers, are plastics having a variety of applications. One disadvantage of these polymers, however, is that in general they do not contain any reactive groups so that they are either inaccessible to a number of crosslinking reactions or they show inadequate compatibility with other macromolecular substances. The copolymerisation of ethylene with monomers containing reactive groups generally alters the properties of the polymer to an extent such that they differ very considerably from polyethylene or the unmodified ethylene/vinyl ester polymers. In particular, the copolymerisation of reactive monomers such as these greatly reduces the molecular weight of the resulting polymers.

Graft polymers containing carboxyl groups which are obtained by polymerising maleic acid anhydride and α-olefins, such as propylene and isobutylene, or styrene in the presence of a graft substrate are known, for example, from U.S. Pat. No. 3,737,483. However, products of this type show serious incompatibilities. U.S. Pat. No. 3,953,541 describes a process by which inter alia unsaturated carboxylic acids and their anhydrides or esters may be grafted onto copolymers of dienes with ethylene or $C_3$–$C_8$-α-olefins. To obtain good grafting yields, the process has to be carried out in suspension in a suitable organic solvent, such as an aromatic or cycloaliphatic hydrocarbon or saturated carboxylic acid, or an anhydride or ester thereof. Attempts have also been made to introduce carboxylic groups into ethylene/vinyl ester copolymers, for example by grafting them with fumaric acid in the presence of ketones. Unfortunately, only very low molecular weight graft branches are obtained in this way. German Offenlegungsschrift No. 2,710,771 and U.S. Pat. No. 4,157,362 describe processes for carboxylating ethylene/vinyl acetate copolymers in which unsaturated carboxylic acids or their anhydrides together with vinyl compounds, such as vinyl acetate, or acrylic esters are used as the graft monomer. These known processes have to be carried out in heterogeneous phase without altering the physical form of the graft substrate in acetic acid alkyl esters or mixtures thereof with lower alcohols or in ketones or mixtures thereof with acetic acid alkyl esters.

It has now been found that ethylene graft copolymers containing anhydride or carboxyl groups are obtained, without the basic properties of the graft substrate being significantly affected and without any incompatibilities occurring between the components of the graft copolymer, by radically polymerising mixtures of maleic acid anhydride and/or its semiesters with vinyl esters, preferably vinyl acetate, in the presence of ethylene homopolymers or copolymers as the graft substrate and tert.-butanol or methylene chloride as the organic reaction medium. The graft copolymers containing anhydride groups may then be reacted with $C_1$–$C_{20}$-alkyl alcohols, ammonia or $C_1$–$C_{20}$-alkyl amines to form the corresponding semiesters or semiamides. $C_1$–$C_{10}$-alkyl alcohols or $C_1$–$C_{10}$-alkyl amines, for example cyclohexanol, butanol, ethyl hexyl alcohol or methanol, are preferably used for this purpose.

The present invention provides a process for the production of ethylene graft copolymers containing anhydride or carboxyl groups in homogeneous or heterogeneous phase in an organic solvent, characterised in that (A) from 5 to 70% by weight, and preferably from 5 to 30% by weight, of a monomer mixture of:

(a) from 10 to 70% by weight, and preferably from 25 to 50% by weight, of a vinyl ester of an aliphatic $C_1$–$C_{18}$-monocarboxylic acid, preferably vinyl acetate;

and (b) from 90 to 30% by weight, and preferably from 75 to 50% by weight, of maleic acid anhydride and/or its $C_1$–$C_{20}$-, preferably $C_1$–$C_{10}$-alkyl semiesters are radically polymerised in the presence of (B) from 95 to 30% by weight, and preferably from 95 to 70% by weight, of an ethylene homopolymer or ethylene/vinyl ester copolymer containing from 5 to 70% by weight, and preferably from 30 to 50% by weight, of copoymerised units of a vinyl ester or aliphatic $C_1$–$C_{18}$-monocarboxylic acid as the graft substrate, in tert.-butanol or methylene chloride, the sum total of (A) and (B) and the sum of (a) and (b) each amounting to 100% by weight.

In addition to the graft substrates mentioned above, it is also possible to use ethylene/acrylic ester copolymers, ethylene/acrylic ester/carbon monoxide copolymers or copolymers of ethylene with propylene, 1-butene or other unsaturated polymerisable hydrocarbons.

Preferred graft substrates are polyethylene and ethylene/vinyl acetate copolymers.

The use of maleic acid anhydride or its semiesters for modifying ethylene polymers by the process according to the invention also has the advantage in terms of process technology that, by virtue of the alternating graft banches and the very marked tendency towards polymerisation, the maleic acid derivatives are preferentially incorporated so that there are left no substantially involatile residual monomers which could hardly be completely removed from the polymers. This applies in particular when at least one mole of the vinyl ester is copolymerised per mole of the maleic acid derivative. Polymerisable maleic acid derivatives in the context of the present invention are maleic acid anhydride and maleic acid semiesters and, optionally, maleic acid semiamides. Where maleic acid anhydride is used, the graft copolymer may be reacted with alcohols or amines to form semiesters and semiamides. The copolymerised anhydride groups themselves may lead to incompatible polymers if they are present in the polymer in relatively large numbers.

The alkyl radicals in the semiesters and semiamides may be, for example, methyl, ethyl, butyl, hexyl, cyclohexyl, ethyl hexyl, trimethyl hexyl and relatively high molecular weight hydrocarbon radicals. These alkyl radicals may in turn contain reactive groups, for example, C=C-double bonds.

It is also possible, albeit at the expense of certain advantages in terms of process technology, to use semiesters of other α,β-unsaturated dicarboxylic acids, for example, fumaric acid.

The comonomers used are vinyl esters, preferably vinyl acetate, although other monomers copolymerisable with maleic acid derivatives, ethylene for example, may also be incorporated in small quantities. The same applies to any other vinyl compounds copolymerisable with maleic acid derivatives and vinyl esters.

The polymerisation catalysts suitable for the graft polymerisation reaction are best used in a quantity of from 0.01 to 1.5% by weight, based on the sum of graft substrate and graft monomers. These quantities may of course be considerably exceeded.

The polymerisation catalysts used may be per compounds or radical-yielding azo compounds, for example, benzoyl peroxide, tert.-butyl perpivalate, tert.-butyl peroctoate, tert.-butyl perbenzoate, di-tert.-butyl peroxide, tert.-butyl perisononanoate, diisopropyl percarbonate, dicyclohexyl percarbonate, acetyl cyclohexyl hexane sulfonyl peroxide and azo-bis-isobutyronitrile.

Benzoyl peroxide, tert.-butyl perivalate, tert.-butyl peroctoate, dicyclohexyl percarbonate and azoisobutyronitrile are particularly suitable.

Known redox systems which may consist of peroxy compounds and both inorganic and organic reducing agents, of the type described, for example, in Methoden der Organischen Chemie, Houben-Weyl, 4th Edition (1961), Vol. 14/1, pages 263-297, are also suitable for carrying out the grafting reaction according to the invention.

Initiator radicals may also be produced by means of UV-irradiation, which may also be carried out in the presence of peroxy compounds optionally with sensitisers, X-rays and gamma-rays or accelerated electrons. Additional regulators of the type normally used in polymerisation reactions may, of course, also be used.

The graft reaction may also be carried out in heterogeneous phase. The graft substrate may be used in the form of granulates, spherical particles, in cylindrical form, platelet form, spiral form or in the form of other shapes.

Where the graft reaction is carried out in the heterogeneous phase, the graft substrates are preferably used in powder form or in granulate from and have particle sizes of from about 1µ up to about 3 cm.

The graft substrates may be brought into contact with the monomer mixture by spraying, spreading, immersion or by dispersion of the substrate in the monomer mixture, the monomers swelling completely or partly into the substrate using methylene chloride as the solvent or swelling agent. The substrate particles may undergo an increase in volume with their original shape substantially intact.

Whether complete dissolution occurs or whether the substrate particles are only swollen depends upon the type and quantity of solvent used, the temperature, the pressure and the type of graft substrate used. The substrate particles are of course partly dissolved in the event of swelling. However, the dissolved part of the individual substrate particle remains substantially in the undissolved part of the substrate particle so that the original shape remains intact despite an increase in volume.

Swelling of the graft substrates may be carried out at temperatures of up to about 70° C., optionally in the presence of the polymerisation catalysts.

The graft copolymerisation reaction may be carried out in homogeneous or heterogeneous phase at temperatures in the range from about −20° C. to +150° C. and preferably at temperatures in the range from +30° C. to +110° C. and under pressures of up to 500 atmospheres gauge, preferably under pressures ranging from normal pressure (1 atm) to 21 atmospheres.

It is also readily possible initially to prepare a homogeneous phase of graft substrate, monomer mixture and optionally catalyst and solvent, to disperse the solution in water and then to carry out polymerisation after addition of the catalyst.

It is also possible to polymerise the graft substrate particles swollen by the monomer mixture, optionally in the presence of a radical former, in the presence of inert or substantially inert gases, such as nitrogen and carbon dioxide.

The process according to the invention is preferably carried out in the form of solution polymerisation, preferably at a temperature in the range from 30° C. to 120° C. Where the graft substrates are produced by mass polymerisation, it is advantageous, in a combined process carried out under high pressure after production of the ethylene polymer, the polymer being kept in its molten state, to add to the polymer the monomer mixture to be grafted on together with methylene chloride and a radical former for carrying out the graft polymerisation reaction.

The preferred solvent is tert.-butanol, particularly when production of the ethylene polymers used as graft substrate and their subsequent grafting is combined in a single process. If, by contrast, the separately produced polymers are re-dissolved in a solvent or only swollen for the graft polymerisation reaction, it is preferred to use methylene chloride.

The process according to the invention may be carried out either continuously or in batches. The graft polymerisation reaction may also be carried out in polymerisation screws and the solvent may be evaporated off from the graft polymer solutions in evaporation screws, thin-layer evaporators or spray dryers. In the process according to the invention, the monomers to be grafted are generally grafted on in quantities of more than 50%. The total quantity of monomers grafted on preferably amounts to more than 5% by weight of the graft substrates. The quantity grafted on may easily be much greater and may even amount to far more than 100%.

The ungrafted fractions of the graft substrate may be separated from the grafted substrate and from the ungrafted polymerised monomer units by fractional precipitation.

The graft copolymers containing anhydride or carboxyl groups considerably extend and improve the service properties of the ethylene polymers through their polarity and reactivity without altering the characteristic favourable properties of the ethylene polymers used as graft substrate. Thus, the adhesion of the polymers to surfaces is considerably improved. It is possible to carry out crosslinking reactions or to introduce further substituents into the polymers through ester or amide groups. Another favourable effect is that the transparency of ethylene-rich polymers is considerably improved. The compatibility of the graft polymers with plastics of different constitution, for example cellulose esters, is also frequently better than that of the graft substrates used.

Accordingly, the products may be used for a variety of applications, for example for the production of mouldings, films, co-extrusion films, adhesives, coatings and for admixture with other plastics.

The invention is illustrated by the following Examples in which the percentages quoted are all percentages by weight.

EXAMPLE 1

A solution of 160 parts by weight of an ethylene/vinyl acetate copolymer containing 45% of vinyl acetate in 800 parts by weight of tert.-butanol was prepared in a three-liter, three-necked flask equipped with a reflux condenser and a thermometer.

After the air present in the reaction vessel had been displaced by nitrogen, 50 parts by weight of maleic acid cyclohexyl semiester and a solution of 0.5 part by weight of cyclohexyl peroxy dicarbonate in 22 parts by weight of vinyl acetate were added at 20° C. in a gentle stream of nitrogen (approximately 3 liters per hour), followed by stirring for 15 minutes at 20° C. until all the constituents had completely dissolved. The internal temperature was then increased to 50° C. and kept constant for 10 hours.

After evaporation of the solvent, the homogeneous solution formed produced clear films characterised by a slightly tacky surface and excellent adhesion to glass.

After precipitation of the solution in water and drying in vacuo at 50° C., 208 g of polymer were obtained. The intrinsic viscosity (as measured in tetrahydrofuran) amounted to 0.98 dl/g. The product could be pressed at 160° C. under a pressure of 200 bars to form clear sheets.

EXAMPLE 2a

Following the procedure of Example 1, a solution of 100 parts by weight of ethylene/vinyl acetate copolymer (vinyl acetate content 45%) in 900 parts by weight of methylene chloride was grafted with a mixture of 10 parts by weight of maleic acid anhydride, 15 parts by weight of vinyl acetate and 0.125 part by weight of cyclohexyl peroxy dicarbonate. A clear solution was obtained, drying to form a glass-clear film.

EXAMPLE 2b

A mixture of 10 parts by weight of maleic acid anhydride, 15 parts by weight of vinyl acetate and 0.125 part by weight of cyclohexyl peroxy dicarbonate was reacted in 900 parts by weight of methylene chloride in the same manner as described in Example 2a. 23.5 parts by weight of a powder-form copolymer of vinyl acetate with maleic acid anhydride were precipitated: intrinsic viscosity 0.43 dl/g (as measured in acetone).

This may be regarded as evidence that, in Example 2a, the polymerised part of the maleic acid anhydride and vinyl acetate had been grafted onto the ethylene/vinyl acetate polymer.

EXAMPLE 3

160 g of an ethylene/vinyl acetate copolymer having a vinyl acetate content of 33.1% were grafted in the same manner as described in Example 1. The solution obtained formed a glass-clear film. After precipitation in water and drying, 203 g of polymer were obtained: intrinsic viscosity 0.96 dl/g (as measured in tetrahydrofuran).

EXAMPLE 4

The procedure was as described in Example 1, except that 50 g of maleic acid-2-ethyl-hexyl semiester were used instead of maleic acid cyclohexyl semiester. 196 g of graft polymer having an intrinsic viscosity of 0.93 dl/g (as measured in tetrahydrofuran) were obtained after precipitation in water and drying. From the solution, the product formed clear films characterised by good adhesion to glass.

EXAMPLE 5

The procedure was as described in Example 1, except that 50 g of maleic acid trimethyl hexyl semiester were used instead of the maleic acid cyclohexyl semiester. The alcohol component of the semiester consisted of an isomer mixture of 60% of 2,4,4-trimethyl-1-hexanol and 40% of 3,5,5-trimethyl-1-hexanol.

201 g of a precipitated, dry product having an intrinsic viscosity (as measured in tetrahydrofuran) of 0.91 dl/g were obtained. After drying, the solution formed glass-clear films.

EXAMPLE 6

Following the procedure described in Example 1, the ethylene/vinyl acetate copolymer was grafted under otherwise the same conditions with a mixture of 27 parts by weight of maleic acid methyl semiester, 30 parts by weight of vinyl acetate and 0.28 part by weight of cyclohexyl peroxy dicarbonate. 193 g of graft copolymer having an intrinsic viscosity of 0.98 dl/g (as measured in tetrahydrofuran) were obtained after precipitation. A glass-clear film dried from the solution showed very strong adhesion to glass and metal.

EXAMPLE 7

Crosslinking of a graft copolymer with a triisocyanate 0.92 part by weight of the graft copolymer produced in accordance with Example 3 were dissolved in 8 parts by weight of methylene chloride. 1.85 parts by weight of a 20% by weight solution of 4,4',4''-triisocyanatotriphenyl methane in methylene chloride and 0.01 part by weight of dibutyl tin dilaurate were added to the resulting solution.

The solution had gelled completely after standing for about 8 hours at 20° C. A film formed on glass was completely crosslinked after drying for 24 hours at 20° C. In other words, this graft substrate was grafted and incorporated into the network.

EXAMPLE 8

Following the procedure described in Example 1, the ethylene/vinyl acetate copolymer was grafted with a mixture of 32 parts by weight of maleic acid anhydride, 44 parts by weight of vinyl acetate and 0.52 part by weight of cyclohexyl peroxy dicarbonate. 189 g of graft polymer were obtained after precipitation in water. A film drawn from the solution was slightly clouded.

EXAMPLE 9

Reaction of the graft product produced in accordance with Example 8 to form the semiamide 8 parts by weight of graft product were dissolved in 90 parts by weight of tert.-butanol, after which 0.5 part by weight of cyclohexyl amine was added to the resulting solution which was then heated for 10 hours to 82° C.

The solution was precipitated with water and the product dried in vacuo at 50° C. 7.8 parts by weight of the corresponding cyclohexyl semiamide were obtained. A slightly opaque film was obtained from a 10% tetrahydrofuran solution after drying.

EXAMPLE 10

The graft product produced in accordance with Example 8 was reacted with 0.9 part by weight of dodecyl amine in the manner described in Example 9. 7.3 parts by weight of the corresponding dodecyl semiamide were obtained after precipitation. A clear film was formed after drying from a 10% tetrahydrofuran solution.

EXAMPLE 11

1280 parts by weight of an ethylene/vinyl acetate copolymer containing 8% of vinyl acetate and 3900 parts by weight of methylene chloride were introduced into a 12 liter autoclave equipped with an anchor stirrer. After it had been purged 3 times with nitrogen under 2 bars, the autoclave was closed and its contents were dissolved over a period of 3 hours at 85° C. with the stirrer rotating at 100 revolutions per minute. A solution of 400 parts by weight of maleic acid cyclohexyl semiester and 176 parts by weight of vinyl acetate in 750 parts by weight of methylene chloride was then introduced into the autoclave under nitrogen pressure, followed by stirring for 15 minutes at 85° C. A solution of 5.4 parts by weight of benzoyl peroxide in 300 parts by weight of methylene chloride was then introduced, followed by stirring for another 10 hours at 85° C. After cooling, a powder-form product was formed, which was filtered off under suction, washed with 5000 parts by weight of methylene chloride and dried at 50° C. 1580 parts by weight of graft polymer were obtained. Transparent films can be produced from the product.

EXAMPLE 12

1280 parts by weight of pure polyethylene were grafted in accordance with Example 11. The yield of graft polymer amounted to 1420 parts by weight. Transparent films and mouldings of high strength and stability can be produced from the product.

We claim:

1. A process for the production of ethylene graft copolymers containing anhydride or carboxyl groups in homogeneous or heterogeneous phase in an organic solvent, wherein (A) from 5 to 70% by weight of a monomer mixture of:
　(a) from 10 to 70% by weight of a vinyl ester of an aliphatic $C_1$-$C_{18}$-monocarboxylic acid; and
　(b) from 90 to 30% by weight of maleic acid anhydride, its $C_1$-$C_{20}$-alkyl semiesters or mixtures thereof;
are radically polymerised in the presence of
(B) from 95 to 30% by weight of an ethylene homopolymer or an ethylene/vinyl ester copolymer containing from 5 to 70% by weight of copolymerised units of a vinyl ester of an aliphatic $C_1$-$C_{18}$-monocarboxylic acid as the graft substrate in tert.-butanol or methylene chloride, the sum total of (A) and (B) and the sum total of (a) and (b) each amounting to 100% by weight.

2. A process as claimed in claim 1, wherein the vinyl ester in the monomer mixture A, in the graft substrate B or in both is vinyl acetate.

3. A process as claimed in claim 1 or 2, wherein, in a first step, the ethylene homopolymer or copolymer used as the graft substrate B is produced in known manner and, in a second step, the monomer mixture A to be grafted on is added to the resulting reaction mixture without isolation of the graft substrate, and radically polymerised.

4. A process as claimed in claim 3, wherein the graft substrate is produced under pressures above 1000 bars, after which the ethylene pressure is reduced to below 400 bars and the graft polymerisation reaction is carried out after the addition of methylene chloride and monomer mixture to be grafted on.

5. A process as claimed in claim 3, wherein, in the first step for preparing the graft substrate, ethylene and vinyl ester are copolymerised in tert.-butanol, residual ethylene is largely removed by reducing the pressure after a conversion of at least 20% of the monomers has been reached and, in the second step, maleic acid anhydride, its semiesters or a mixture thereof is added to the reaction mixture obtained which is then radically polymerised together with the remaining vinyl ester.

6. A process as claimed in claim 1 or 2, wherein vinyl esters and maleic acid anhydride are used as the graft monomer and the anhydride groups in the graft copolymer are subsequently reacted with $C_1$-$C_{20}$-alkyl alcohols, ammonia or $C_1$-$C_{20}$-alkyl amines to form semiester or semiamide groups.

7. A process as claimed in claim 3, wherein the monomer mixture (a) to be grafted on is added to the resulting reaction mixture without isolation of the graft substrate and after reduction of unreacted ethylene.

* * * * *